(12) United States Patent
Weber et al.

(10) Patent No.: US 8,551,383 B2
(45) Date of Patent: Oct. 8, 2013

(54) METHOD FOR THE LOCALIZED WORKING OF A STRUCTURAL COMPONENT AT A WORKING LOCATION

(75) Inventors: Hans-Jürgen Weber, Verden (DE); Gregor Christian Endres, Pfaffenhofen (DE)

(73) Assignee: Airbus Operations GmbH, Hamburg (DE)

( * ) Notice: Subject to any disclaimer, the term of this patent is extended or adjusted under 35 U.S.C. 154(b) by 583 days.

(21) Appl. No.: 12/521,442

(22) PCT Filed: Jan. 22, 2008

(86) PCT No.: PCT/EP2008/050693
§ 371 (c)(1), (2), (4) Date: Sep. 27, 2010

(87) PCT Pub. No.: WO2008/090145
PCT Pub. Date: Jul. 31, 2008

(65) Prior Publication Data
US 2012/0141769 A1  Jun. 7, 2012

Related U.S. Application Data

(60) Provisional application No. 60/881,942, filed on Jan. 23, 2007.

(30) Foreign Application Priority Data

Jan. 23, 2007  (DE) .......................... 10 2007 003 273

(51) Int. Cl.
*B29C 39/10* (2006.01)
*B29C 39/12* (2006.01)

(52) U.S. Cl.
USPC ........... 264/267; 264/263; 264/296; 264/139; 264/36.11; 264/36.22

(58) Field of Classification Search
None
See application file for complete search history.

(56) References Cited

U.S. PATENT DOCUMENTS

| 3,902,940 A | 9/1975 | Heller et al. |
| 2001/0031350 A1 | 10/2001 | Day et al. |

(Continued)

FOREIGN PATENT DOCUMENTS

| DE | 20314187 | 12/2003 |
| DE | 10 2005024408 | 11/2006 |

(Continued)

OTHER PUBLICATIONS

Ferret B. et al., "Metal Inserts in Structural Composite Materials Manufactured by RTM," Jan. 1, 1998, *Composites, IPC Business Press Ltd. Haywards Heath, GB*, pp. 693-700, XP004120881.

(Continued)

*Primary Examiner* — Edmund H. Lee
(74) *Attorney, Agent, or Firm* — Jenkins, Wilson, Taylor & Hunt, P.A.

(57) ABSTRACT

The present invention provides a method for the localized working of a structural component that comprises a foam material reinforced by at least one strut at a working location. Firstly, the foam material is selectively removed, while leaving the at least one strut, within a strut connecting zone in the region of the working location. Subsequently, the strut connecting zone is filled with a filling material and the at least one strut is connected to the filling material in the strut connecting zone. From a further aspect, a sandwich component which comprises a foam core is provided. An embedding part is at least partially embedded in the foam core and at least partially surrounded by a layer of filling material. At least one strut is incorporated in the foam material, fastened at one end to the surface of the foam core and integrated at another end in the layer of filling material.

11 Claims, 4 Drawing Sheets

(56) References Cited

U.S. PATENT DOCUMENTS

| | | |
|---|---|---|
| 2004/0028877 A1 | 2/2004 | Itoh et al. |
| 2009/0525917 | 10/2009 | Weber et al. |

FOREIGN PATENT DOCUMENTS

| | | |
|---|---|---|
| GB | 2345054 | 6/2000 |
| RU | 2084370 | 7/1997 |
| RU | 2122663 | 11/1998 |
| SU | 766951 | 9/1980 |

OTHER PUBLICATIONS

"Preloaded Composite-Strut/End-Fitting Joint," Sep. 1, 1990, *NTIS Tech Notes, US Department of Commerce*, Springfield, VA, p. 730, XP000162559.

International Search Report for PCT/EP/2008/050693 dated May 28, 2008.

Decision to Grant for Russian Application Serial No. RU 2009128261/05(039264) dated Jan. 10, 2012.

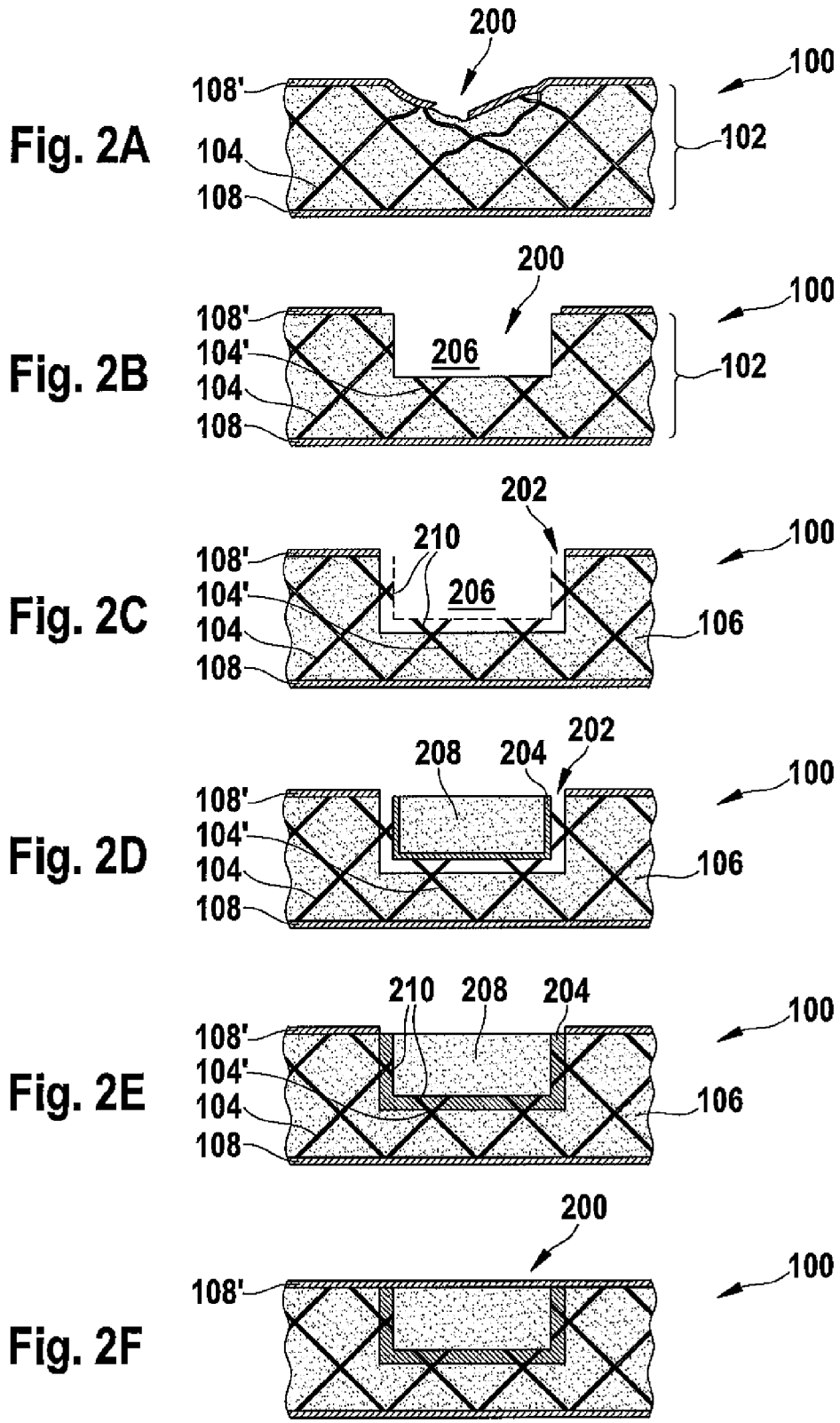

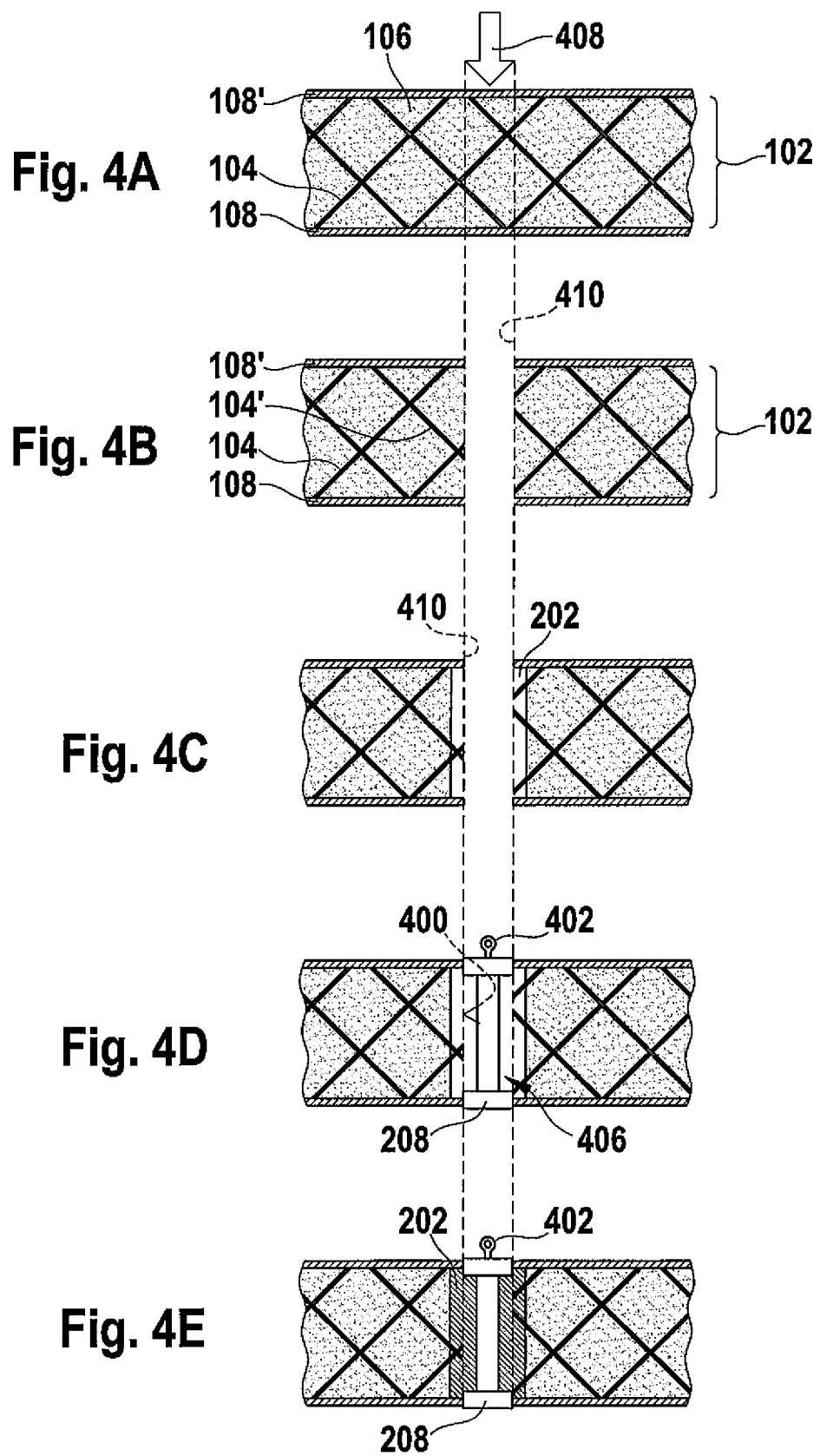

METHOD FOR THE LOCALIZED WORKING OF A STRUCTURAL COMPONENT AT A WORKING LOCATION

FIELD OF THE INVENTION

The present invention relates to the technical field of composite materials. In particular, the invention relates to a method for the localized working of a structural component that comprises a reinforced foam material. The invention also relates to a sandwich component and to an aircraft with such a sandwich component or with a structural component which has been worked by using the method according to the invention.

Although it can be applied to any desired reinforced foam materials, the present invention and the problems on which it is based are explained with respect to sheet-like sandwich structures with a foam core that is reinforced by fibres infiltrated with a resin, enclosed between outer layers.

BACKGROUND OF THE INVENTION

Composite materials, and in particular so-called sandwich structures, have a wide range of applications in the area of aircraft construction on account of their good ratio of stiffness and strength to density. Sandwich structures generally have an upper outer layer and a lower outer layer, between which there is, for example, a core structure of vertically running cells of hexagonal cross section, to increase the stiffness.

An alternative to such honeycomb structures are rigid foams. They have advantages over honeycomb structures, inter alia in the area of thermal and acoustic insulation and in the process technology for the production of sandwich structures. One disadvantage of these foam structures is the lower mechanical strength obtained with the same density.

To compensate for this lower strength, sandwich structures with foam cores can be additionally reinforced by introducing bracing elements into the core. Sewing methods in particular offer the possibility of introducing fibres and filaments to form struts at different angles and with a density varying over the component. The technically achievable stitching speeds allow rapid reinforcement of the component to be possible. After a resin infiltration process, the pierced regions contribute to the mechanical reinforcement of the basic foam material. Such structures are already used in sandwich structures in the construction of trucks and in shipbuilding.

DE 10 2005 024 408 A1 discloses a sewing method in which a through-hole is first pierced into the foam material from one side with the needle, to then allow the needle to be used to pick up a bundle of fibres provided on the other side and draw it into the foam material. Since the bundle of fibres largely fills the through-hole, only little resin is incorporated in a subsequent infiltration, which leads to an improved ratio of the mechanical strength achieved to the density of the sandwich structure and makes corresponding structures suitable for use in aircraft construction.

The reinforcing effect is in this case based on tensile loading of the struts introduced. These can only absorb forces when they are connected at both ends to a pressure-resistant element, generally an outer layer of the sandwich structure. If they are severed in the middle or detached at one end, they are mechanically ineffectual.

Since the struts typically run at different defined angles in relation to the outer layer, there is the problem that, in the case of localized working at a working location of a sandwich structure reinforced in this way, the mechanical strength of the sandwich structure is reduced in a region that is increased beyond the worked region, in which struts lose their mechanical effect. In this increased region, the reinforced foam material becomes the strength-determining element, which has the effect that the mechanical properties greatly change locally, in particular in the case of lightweight foams.

SUMMARY OF THE INVENTION

It is therefore the object of the present invention to provide a working method which allows reinforced foam materials to be locally worked without causing any impairment of the mechanical properties in an enlarged region around the working location.

This object is achieved according to the invention by a method for the localized working of a foam material that comprises a reinforced foam material with the features of patent claim 1 as well as by a sandwich component with the features of patent claim 11.

The idea on which the present invention is based is that the foam material is selectively removed within a strut connecting zone in the region of the working location at which the localized working is performed, wherein the struts originally incorporated in the selectively removed foam material are exposed. The strut connecting zone is subsequently filled with a filling material, so that the struts within the strut connecting zone are then embedded in the filling material. Subsequently, the struts are connected to the filling material.

In this way, struts which, as a result of the localized working, are severed, detached on one side or milled away in the region of the working location, and so have become mechanically ineffectual, are once again connected by one end to a compression-resistant element, to be specific the filling material filling the entire strut connecting zone. If the other end of a strut lies outside the working location, it has also not become detached by the localized working, and so that the strut can once again absorb tensile loads, to be precise now between the end that is connected in an unchanged manner outside the working location and the end that is newly connected by the method according to the invention in the filling material.

Consequently, a connection on both sides of all the struts running in the region around the working location is restored, so that the struts retain their full mechanical effect and there is no impairment of the mechanical properties of the structural component around the working location as they were before the working.

From a further aspect, the invention provides a sandwich component which comprises a foam core. An embedding part is at least partially embedded in the foam core and at least partially surrounded by a layer of filling material. At least one strut is incorporated in the foam material, fastened at one end to the surface of the foam core and integrated at the other end in the layer of filling material. The embedding part makes enhanced functions of the sandwich component possible, such as for example the anchorage of fastening elements with undiminished stability in comparison with a corresponding sandwich component without an embedding part.

Advantageous refinements and improvements of the invention can be found in the subclaims.

According to a preferred development, a curable compound is used as the filling material. In this case, the connecting of the least one strut to the filling material takes place by curing of the filling material. This is particularly advantageous, since the curable compound can be introduced before curing in a simple way, for example by injection, even into a strut connecting zone to which access is difficult and the ends of the struts that are exposed in the strut connecting zone are surrounded by the compound and securely integrated.

According to a preferred development, the selective removal of the foam material is performed by particle blasting, in particular by sand, glass-granule or plastic-granule blasting. This is particularly advantageous, since particle blasting makes it possible to release the foam material gently from the strut connecting zone, without damaging even thin struts. Furthermore, with particle blasting it is possible particularly easily, even in the case of a position to which access is difficult, to achieve a uniform depth of the strut connecting zone around the working location.

According to a preferred development, a step of completely removing the foam material and the at least one strut in a decored region of the working location is provided, complete removal being performed in particular by drilling or milling. This makes it possible to create a space that is free from struts, so that, for example, openings can be formed in the structural component. Preferably, the selective removal of the foam material, while leaving the at least one strut, is performed in this case in such a way that the strut connecting zone at least partially encloses the decored region. As a result, the remains of the struts running through the decored region before working are securely connected along the limit of the decored region. The size of the strut connecting zone is preferably chosen such that an extension of the decored region plus the strut connecting zone in one spatial direction is up to two times the extension of the decored region alone in the same spatial direction. Furthermore, an embedding part which is formed in a way corresponding to the decored region of the working location, such that an enveloping surface of the embedding part at least partially fills it, is preferably provided. The embedding part is inserted into the decored region of the working location and connected to the filling material. This is particularly advantageous on the one hand since the embedding part makes enhanced functions possible, such as for example the anchorage of fastening elements. On the other hand, since it is connected to the filling material, the embedding part undertakes the structural function of the material that is completely removed from the decored region, which makes it possible for the method to be used for repairing locally damaged structural components.

An expansion adhesive is preferably used as the filling material, a step of applying the expansion adhesive to a surface of the embedding part also being provided. The filling of the strut connecting zone takes place by expansion of the expansion adhesive. Since the expansion adhesive can be applied to the embedding part before it is inserted, all the surfaces of the embedding part are easily accessible, which makes it possible to fill the strut connecting zone reliably and completely even in regions to which access is difficult when the embedding part is inserted.

According to a preferred development, an initial step of removing at least one outer layer of the structural component in the region of the working location is also provided. In this way it is possible, for example, to repair sandwich structures on which an outer layer has been damaged, or else to provide openings for introducing embedding parts in particular, such as for example flanges, with an exact fit.

According to a preferred development of the sandwich component according to the invention, the at least one strut has at least one bundle of fibres arranged in a through-hole and infiltrated in particular with a resin. On account of the low weight of the strut, this sandwich component has a particularly favourable ratio of mechanical strength to density.

According to a preferred development, the embedding part has a fastening element for fastening the sandwich component to further components. This makes the structural connection to further components possible.

According to a preferred development, the embedding part has a lateral depression profile, which is at least partially filled by the filling material. This is particularly advantageous, since the depth profile is in positive engagement with the filling material and so provides particularly firm anchorage of the embedding part in the sandwich component.

According to a preferred development, the filling material comprises an adhesive, in particular an expansion adhesive. The embedding part and the foam material are adhesively bonded to each other by the filling material. Here, particularly firm anchorage is achieved by the adhesive bonding of the embedding part with the foam material and struts.

BRIEF DESCRIPTION OF THE DRAWINGS

The invention is explained in more detail below on the basis of exemplary embodiments with reference to the accompanying figures of the drawing, in which:

FIG. 2A-F shows the repair of a locally damaged sandwich structure by method according to a first implement of the invention;

FIG. 4A-E shows the insertion of a flange into a sandwich structure by a method according to a third body with of the invention.

In the figures, the same reference numerals denote identical or functionally identical components, as long as nothing contrary is specified.

DETAILED DESCRIPTION OF THE DRAWINGS

Figure 1:
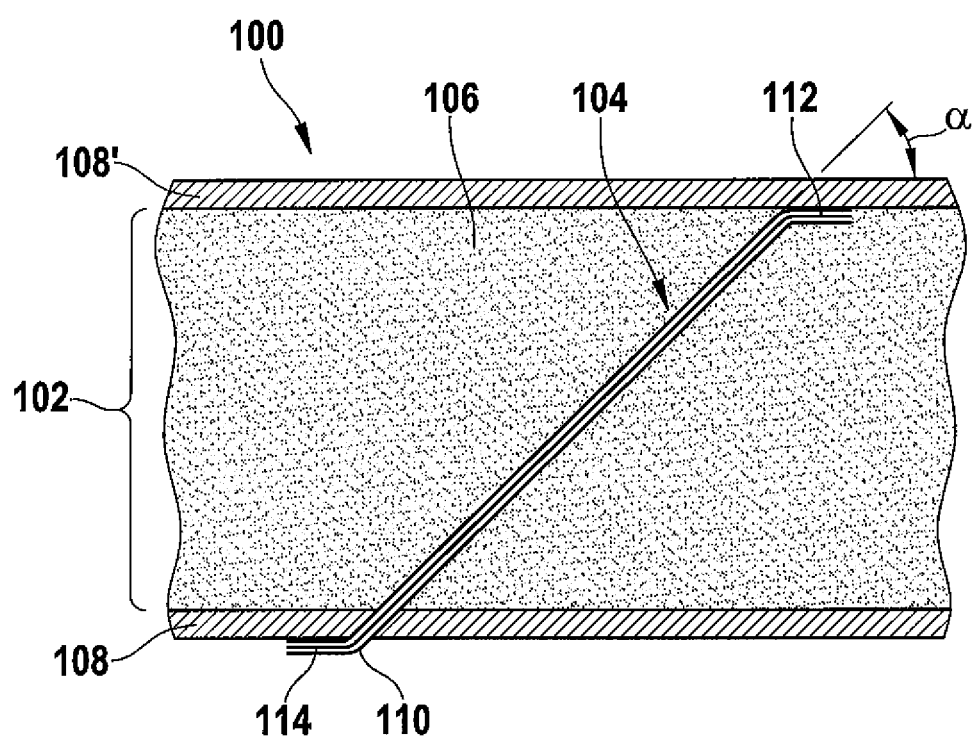
FIG. 1 shows a schematic sectional view of a sandwich structure, given by way of example, with a reinforced foam core.

FIG. 1 shows as a detail, in a schematic sectional view, an example of a sandwich component 100, which comprises a core structure 102 enclosed between two outer layers 108, 108'. The core structure 102 substantially comprises a foam material 106, for example a high-grade PMI rigid foam, as advantageously used in aviation. It goes without saying, however, that other foam materials, consisting for example of polytetrafluoroethylene or polyurethanes, may also be used.

The foam material 106 used in the core structure 102 is reinforced by a multiplicity of struts 104, which run through the foam material 106 between the two outer layers 108, 108' and of which a single strut 104 is shown here by way of example.

To form the strut 104, a through-hole has been introduced into the foam core 102 by means of a sewing method and a bundle of fibres 110 has been incorporated in it. Subsequently, the through-hole is infiltrated with resin (not shown).

The strut 104 is placed at both its ends 112, 114 against in each case one of the outer layers 108, 108' and fastened, for example in the course of infiltration with resin. By way of example, one of the ends 112 shows that the bundle of fibres can be embedded between outer layer 108' and foam material, while the other end 114 shows that the bundle of fibres 110 can be placed against the outer side of an outer layer 108. Further fastening variants are possible.

The strut 104 forms, by way of example, an angle α with the outer layers 108, 108'. The fastening of both ends 112 and 114 of the strut 104 has the effect that, under corresponding bending of the sandwich structure 100, the strut 104 is subjected to tensile loading. A multiplicity of similar struts, which under differing loading of the sandwich structure are respectively subjected to tensile loading, may have been introduced into the foam material at any desired angular position.

FIG. 2A likewise shows as a detail, in a schematic sectional view, a sandwich component 100 of the type explained, in which a multiplicity of struts 104 are respectively arranged at regular intervals in two different orientations at an angle of about 45° in relation to the outer layers 108, 108' to reinforce the foam core. The upper outer layer 108' and the foam core 102 lying under it are damaged at a location 200. The application of an embodiment of the method according to the invention for repairing the damaged sandwich structure 100 is to be explained on the basis of the following FIGS. 2B to 2F.

In FIG. 2B, in a first method step, the damaged part of the core structure 102 and the outer layer 108' has been removed from the damaged sandwich structure from FIG. 2A in a decored region 206 at the location 200. The removal is performed by the prior-art methods, for example milling. In the region around the working location 200, this produces struts 104, 104' that only have a connection on one side, and are consequently mechanically ineffectual. For example, strut 104 has been milled away on one side, while the strut 104' has been severed in the middle, producing from each of the two separate halves a mechanically ineffectual strut that is only connected on one side.

To firmly reconnect the struts on the free sides, as shown in FIG. 2C, the foam material is selectively removed in a zone 202 that is adjacent the decored region 206 and surrounds it to the sides and in a downward direction, so that the ends 210 of the struts protrude from the surface of the foam material 106. An expedient method for the step is the use of sand-blasting or other particle-blasting devices, such as particle-granule or glass-granule blasting devices, which are capable of removing the foam 106 while leaving the struts 104.

For the actual repair of the core structure, the decored region 206 and the strut connecting zone 202 are filled in various ways. In the decored region 206, in which the core structure 102 has been completely removed, an embedding part 208 is placed as a corresponding replacement structure, as shown in FIG. 2D. To serve as a mechanically equivalent replacement for the reinforced foam material that was originally present in the decored region 206, an embedding part 208 with sufficient mechanical properties is expediently used, for example a honeycomb or a foam material of an unreinforced strength that corresponds to the strength of the removed reinforced foam material.

In the strut connecting zone 202, in which the free ends 210 of the struts 104, 104' are located, a solid connecting layer 202 is created in a further step. As shown in FIG. 2D, before it is inserted the embedding part 208 is enveloped with an expansion adhesive 204 as a filling material on its sides facing the strut connecting zone 202. Depending on the type of expansion adhesive 204 that is chosen, it expands for example under the effect of heat, which can be provided locally at the working location 200 by a suitable heating device.

FIG. 2E shows the state after the expansion of the expansion adhesive 204, which in the course of its expansion has filled the strut connecting zone 202 and integrated the previously free ends 210 of the struts 104, 104'. As a result of this step, on the one hand the struts 104, 104' can again absorb force; on the other hand, the embedding part 208 is connected to the undamaged region of the sandwich structure 100. As alternatives to the expansion adhesive 204 shown, pourable or injectable adhesives and resins may also be used.

In a final step, as shown in FIG. 2F, the outer layer 108' of the sandwich structure is closed again at the working location 200 by means of prior-art methods.

Figure 3A:
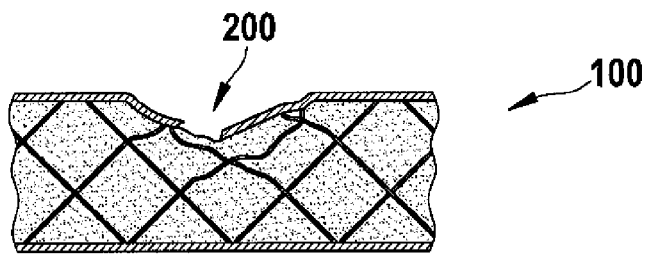
FIG. 3A-F shows the repair of a locally damaged sandwich structure by method according to a second embodiment of the invention.
Figure 3B:
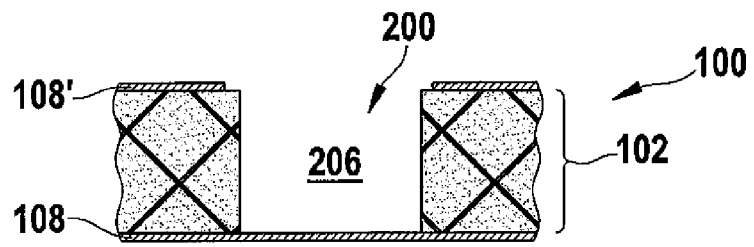
Figure 3C:
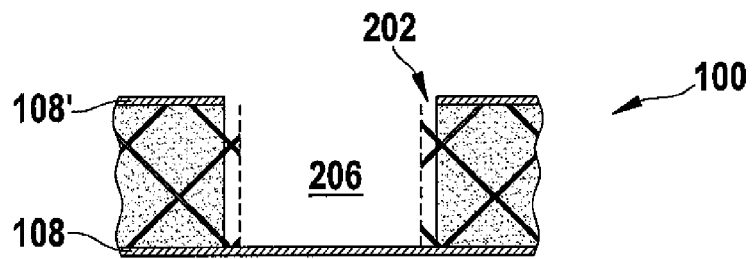
Figure 3D:
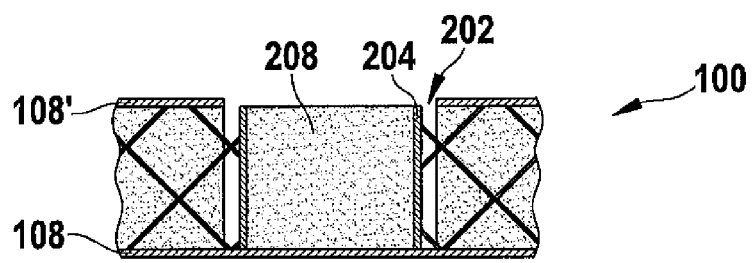
Figure 3E:
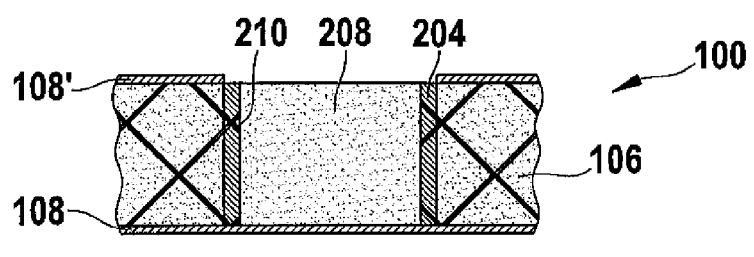
Figure 3F:
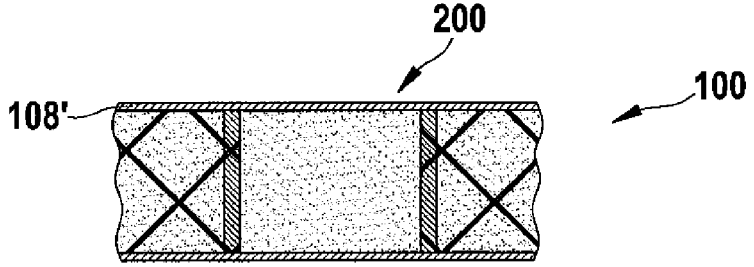

FIG. 3A-F shows the repair of a similarly damaged sandwich structure 100 by a second embodiment of the method according to the invention. It differs from the embodiment shown in FIG. 2A-F by the fact that the core structure 102 is completely removed at the damaged location 200, as can be seen in FIG. 3B. As a consequence, as shown in FIG. 3C, the strut connecting zone 202 is restricted to the lateral edges of the decored region 206. As shown in FIG. 3D, the embedding part 208 is correspondingly only laterally provided with expansion adhesive 204 and is instead adhesively bonded to the lower outer layer 108 by non-expanding adhesive (not shown) when it is inserted into the decored region. The final steps that are shown in FIGS. 3E and 3F do not differ from the steps shown in FIGS. 2E and 2F of the embodiment described further above.

FIG. 4A-E shows the insertion of a flange 208 as an embedding part into a sandwich structure by a method according to a third embodiment of the invention. As a difference from the embodiments referred to above, the initial state that is shown in FIG. 4A is an undamaged sandwich component with a core structure 102 comprising a foam material 106 reinforced by struts 104 as well as an upper outer layer 108' and a lower outer layer 108.

As represented by the arrow 408, firstly a hole 410 is made, shown in FIG. 4B and having the diameter of the flange 208 that is to be inserted. Instead of the through-hole 410 shown, it may also be a sufficiently deep blind hole. This produces struts 104', which are only connected on one side to an outer layer 108, 108', and therefore cannot transfer any forces.

As shown in FIG. 4C, the foam material is then selectively removed, for example by means of sand blasting, in a strut connecting zone 202 arranged around the hole 410. As shown in FIG. 4D, the flange 208 is inserted into the hole. Since the hole 410 is made to match the diameter of the flange 208, the enveloping surface 400 of the latter fits exactly through the hole 410 in the outer layer. In this step that is shown in FIG. 4E, finally an adhesive is injected into the cavity around the flange 208 that encloses the strut connecting zone 202. After the adhesive has set, it encloses the ends of the reinforcing elements. As a result, on the one hand they can transfer forces again; on the other hand, the flange is connected particularly stably to the core structure 102. The depth profile 406 of the flange that is marked in FIG. 4D serves for further improved anchorage as well as additional weight saving. The flange 208 shown carries a fastening element 402, by means of which the sandwich structure can be connected to other components.

Although the present invention has been described in the present case on the basis of preferred exemplary embodiments, it is not restricted to these but can be modified in various ways.

For example, the method shown can be used for the purpose of sealing the edge regions by sawing cut-to-size sheet-like sandwich structures with core structures of reinforced foam materials, with strut connecting regions being formed along the cut edges by sand blasting in order to connect exposed strut ends in the sealing of the edges and so create a stable cut edge.

What is claimed is:
1. A method for the localized working of a structural component at a working location, the structural component comprising a foam material reinforced by at least one strut running through the foam material, the strut comprising a bundle of fibres infiltrated by a resin, the method comprising the steps:

selective removal of the foam material, while leaving the at least one strut, within a strut connecting zone in the region of the working location;

filling the strut connecting zone with a filling material; and connecting the at least one strut to the filling material in the strut connecting zone.

2. The method according to claim 1, wherein a curable compound is used as the filling material and the connecting of the at least one strut to the filling material takes place by curing of the filling material.

3. The method according to claim 1, wherein the selective removal of the foam material is performed by particle blasting.

4. The method according to claim 1, wherein a step of completely removing the foam material and the at least one strut in a decored region of the working location is provided.

5. The method according to claim 4, wherein the selective removal of the foam material is performed in such a way along a limit of the decored region that the strut connecting zone at least partially encloses the decored region.

6. The method according to claim 5, wherein by the selective removal of the foam material along the limit of the decored region, the decored region plus the strut connecting zone in one spatial direction is extended to up to two times the extension of the decored region alone in the same spatial direction.

7. The method according to claim 4, wherein the following steps are also provided:

providing an embedding part which is formed in a way corresponding to the decored region of the working location, such that an enveloping surface of the embedding part at least partially fills it;

inserting the embedding part into the decored region of the working location; and connecting the embedding parts to the filling material.

8. The method according to claim 7, wherein an expansion adhesive is used as the filling material, a step of applying the expansion adhesive to a surface of the embedding part also being provided, and the filling of the strut connecting zone taking place by expansion of the expansion adhesive.

9. The method according to claim 1, wherein an initial step of removing at least one outer layer of the structural component in the region of the working location is also provided.

10. The method according to claim 3, wherein the selective removal of the foam material is performed by sand blasting, glass-granule blasting, or plastic-granule blasting.

11. The method according to claim 4, wherein complete removal of the foam material and the at least one strut in a decored region of the working location is performed by drilling or milling.

* * * * *